(12) United States Patent
Gehler et al.

(10) Patent No.: US 11,462,037 B2
(45) Date of Patent: Oct. 4, 2022

(54) SYSTEM AND METHOD FOR AUTOMATED ANALYSIS OF ELECTRONIC TRAVEL DATA

(71) Applicant: Walmart Apollo, LLC, Bentonville, AR (US)

(72) Inventors: Theresa Gehler, Bentonville, AR (US); Arumugam Jayavelu, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 249 days.

(21) Appl. No.: 16/739,965

(22) Filed: Jan. 10, 2020

(65) Prior Publication Data
US 2020/0226364 A1    Jul. 16, 2020

Related U.S. Application Data

(60) Provisional application No. 62/791,332, filed on Jan. 11, 2019.

(51) Int. Cl.
| | |
|---|---|
| *G06K 9/18* | (2006.01) |
| *G06V 30/413* | (2022.01) |
| *G06Q 50/14* | (2012.01) |
| *G06Q 50/18* | (2012.01) |
| *G06N 20/00* | (2019.01) |
| *G06F 40/131* | (2020.01) |
| *G06V 10/40* | (2022.01) |

(Continued)

(52) U.S. Cl.
CPC .......... *G06V 30/413* (2022.01); *G06F 40/131* (2020.01); *G06N 20/00* (2019.01); *G06Q 50/14* (2013.01); *G06Q 50/188* (2013.01);

*G06V 10/40* (2022.01); *G06V 30/414* (2022.01); *G06V 30/10* (2022.01)

(58) Field of Classification Search
CPC combination set(s) only.
See application file for complete search history.

(56) References Cited

U.S. PATENT DOCUMENTS

| | | |
|---|---|---|
| 6,427,032 B1 | 7/2002 | Irons |
| 6,640,145 B2 | 10/2003 | Hoffberg |

(Continued)

FOREIGN PATENT DOCUMENTS

| | | |
|---|---|---|
| CA | 2485033 A1 | 4/2005 |
| JP | 1013643 A | 1/1998 |
| WO | 2019113576 | 6/2019 |

OTHER PUBLICATIONS

"How Kira Works", Kira Systems, URL: https://kirasystems.com/how-it-works/, Retrieved: Sep. 17, 2018, 5 pages.

(Continued)

*Primary Examiner* — Solomon G Bezuayehu
(74) *Attorney, Agent, or Firm* — Fitch, Even, Tabin & Flannery LLP

(57) ABSTRACT

Exemplary embodiments relate to systems, methods and computer readable medium for automatically processing and classifying and optimizing travel contracts, travel data, and travel purchase decisions. An example system includes an image processing module, an image segmentation module, a segment filtering module, a classification module, a validation module, an analysis module, and an optimization module.

20 Claims, 9 Drawing Sheets

(51) Int. Cl.
*G06V 30/414* (2022.01)
*G06V 30/10* (2022.01)

(56) References Cited

U.S. PATENT DOCUMENTS

| | | | |
|---|---|---|---|
| 7,457,467 B2 | 11/2008 | Dance | |
| 7,669,148 B2 | 2/2010 | Hull | |
| 7,702,673 B2 | 4/2010 | Hull | |
| 8,184,155 B2 | 5/2012 | Ke | |
| 8,538,184 B2 | 9/2013 | Neogi | |
| 8,540,158 B2 | 9/2013 | Lei | |
| 8,587,613 B2 * | 11/2013 | Wang | G06V 30/40 345/619 |
| 8,996,350 B1 | 3/2015 | Dub | |
| 9,008,447 B2 * | 4/2015 | King | G06K 9/52 382/229 |
| 9,373,029 B2 | 6/2016 | Hull | |
| 9,392,185 B1 | 7/2016 | Kumar | |
| 9,600,779 B2 * | 3/2017 | Hoover | G06Q 30/06 |
| 10,013,643 B2 | 7/2018 | Yellapragada | |
| 10,248,653 B2 | 4/2019 | Blassin | |
| 10,354,203 B1 * | 7/2019 | Carr | G06F 16/35 |
| 10,361,802 B1 | 7/2019 | Hoffberg-Borghesani | |
| 10,496,884 B1 | 12/2019 | Nguyen | |
| 10,528,866 B1 * | 1/2020 | Dai | G06N 3/0445 |
| RE47,889 E | 3/2020 | Saund | |
| 2002/0150300 A1 | 10/2002 | Lee | |
| 2006/0200253 A1 | 9/2006 | Hoffberg | |
| 2007/0112848 A1 | 5/2007 | Wang | |
| 2007/0130148 A1 | 6/2007 | Wu | |
| 2008/0059081 A1 * | 3/2008 | Gualandri | G05B 23/0283 702/34 |
| 2008/0270380 A1 | 10/2008 | Ohrn | |
| 2009/0028445 A1 | 1/2009 | Wu | |
| 2009/0154778 A1 | 6/2009 | Lei | |
| 2010/0191532 A1 | 7/2010 | Rodriguez Serrano | |
| 2010/0241457 A1 | 9/2010 | Kudo | |
| 2010/0331043 A1 | 12/2010 | Chapman | |
| 2011/0007366 A1 | 1/2011 | Sarkar | |
| 2011/0007970 A1 | 1/2011 | Saund | |
| 2011/0243452 A1 | 10/2011 | Sakaguchi | |
| 2011/0302171 A1 | 12/2011 | Waldo | |
| 2011/0311145 A1 | 12/2011 | Bern | |
| 2012/0083960 A1 | 4/2012 | Zhu | |
| 2013/0028487 A1 | 1/2013 | Stager | |
| 2014/0079297 A1 | 3/2014 | Tadayon | |
| 2014/0201126 A1 | 7/2014 | Zadeh | |
| 2014/0214995 A1 | 7/2014 | Zlatokrilov | |
| 2014/0270536 A1 | 9/2014 | Amtrup | |
| 2015/0032645 A1 * | 1/2015 | McKeown | G06Q 50/18 705/311 |
| 2015/0131903 A1 | 5/2015 | Kato | |
| 2016/0117292 A1 | 4/2016 | Lee | |
| 2016/0275376 A1 | 9/2016 | Kant | |
| 2016/0379281 A1 | 12/2016 | Laxmanan | |
| 2017/0116519 A1 | 4/2017 | Johnson | |
| 2017/0270430 A1 * | 9/2017 | Llagostera | G06N 20/00 |
| 2017/0337484 A1 | 11/2017 | Yu | |
| 2018/0012268 A1 | 1/2018 | Simantov | |
| 2018/0220023 A1 | 8/2018 | Wang | |
| 2018/0268506 A1 * | 9/2018 | Wodetzki | G06F 15/76 |
| 2019/0005050 A1 | 1/2019 | Proux | |
| 2019/0087677 A1 | 3/2019 | Wolf | |
| 2019/0180097 A1 | 6/2019 | Ferguson | |
| 2020/0110930 A1 * | 4/2020 | Simantov | G06Q 30/04 |
| 2020/0125898 A1 * | 4/2020 | Zuev | G06N 3/0454 |
| 2020/0184423 A1 * | 6/2020 | McEnroe | G06N 3/0454 |
| 2020/0226364 A1 | 7/2020 | Gehler | |
| 2020/0226700 A1 * | 7/2020 | Halasz | G06N 20/00 |
| 2021/0312360 A1 * | 10/2021 | Kim | G06Q 30/018 |

OTHER PUBLICATIONS

"Know what you sign", Legal Robot—AI for Law, URL: https://www.legalrobot.com/, Retrieved: Sep. 17, 2018, 6 pages.
PCT; App. No. PCT/US2018/064709; International Search Report and Written Opinion dated Mar. 18, 2019; (16 pages).

* cited by examiner

SYSTEM AND METHOD FOR AUTOMATED ANALYSIS OF ELECTRONIC TRAVEL DATA

CROSS-REFERENCE TO RELATED APPLICATIONS

This patent application claims the priority to U.S. Provisional Application No. 62/791,332, filed, Jan. 11, 2019, contents of which are incorporated by reference herein.

BACKGROUND

Companies often enter into a number of contracts with service providers, such as airlines and hotels. These contracts generally provide a discounted rate in exchange for an agreement to buy a certain number of rooms or tickets. The contract may specify the routes and ticket types that fall into a particular price discount range. Thus companies need to monitor a number of different contracts as well as their travel purchase history and needs in order to determine their future contract needs, monitor compliance with the terms of their current contracts, and optimize use of current discounts. Additionally, contract terms may vary in language and meaning. Thus it is advantageous to automatically and adaptively monitor the contracts. Further, optical character recognition allows for adaptive comparison and categorization of contract terms having disparate meaning across different contracts. The contract terms extracted and categorized via optical character recognition may also be used in combination with a centralized database to allow real-time consistent evaluation of compliance and contract term optimization by different users.

BRIEF DESCRIPTION OF DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings.

DETAILED DESCRIPTION

Described in detail herein are systems and methods for automated classification of contract terms. Exemplary embodiments analyze document images of disparate contracts, perform image processing to prepare images for further analysis, segment images into text blocks and determine relevant text blocks from the resultant segments, and analyze the individual text blocks to classify the contract terms into categories and subcategories.

Further described herein are systems and methods for automated analysis of travel data in light of the contract terms. Exemplary embodiments analyze the compliance or discrepancy between the travel data and the contract terms. Still further embodiments use the travel data and contract terms to provide optimized travel data and contract terms with better compliance or lower discrepancy. This optimized information may be used to inform travel purchase decisions, such as an advantageous route, airline, ticket type, or future contract terms that correspond with travel purchase needs.

Companies having a large number of employees often have a large number of contracts with travel service providers, such as airlines, offering discounts based on a number of different conditions including the airline, the route, the ticket type, or the date of travel. The contract terms may offer tens of thousands of different discount combinations. It is not possible to manually monitor all possible combinations in order to make the most advantageous travel purchase decisions and to negotiate the best contract terms. Further, the terms of the contract may be based on the market share that the company gives to an airline in terms of flight segments or revenue. Automatically monitoring this information allows the party to receive the appropriate discount and conform to the contract terms. An exemplary embodiment scans in the disparate contracts; converts the contract to electric form; classifies the contract terms; analyzes travel data in light of the contract terms; and provides optimized travel and contract information.

The exemplary document classification system described herein is capable of processing and classifying disparate contracts that are inputted in the system as scanned document images. The disparate contracts, which may be prepared by a variety of persons or companies, may relate to a variety of travel choices (i.e. airline, route, ticket type, etc.) and have many different forms and contract terms.

Figure 1:
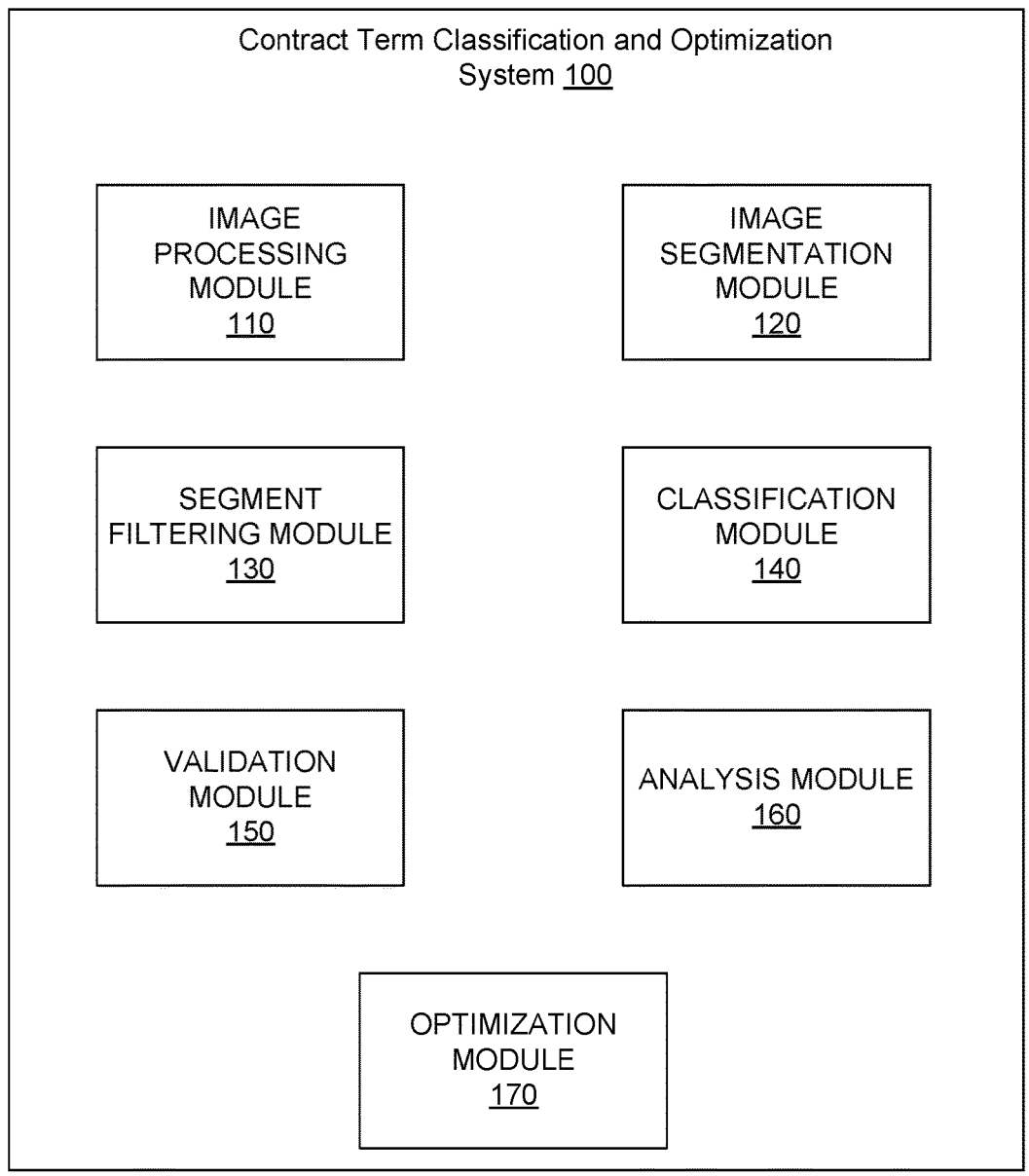
FIG. 1 is a block diagram showing a contract term classification and optimization system implemented in modules, according to an exemplary embodiment.
Figure 7:
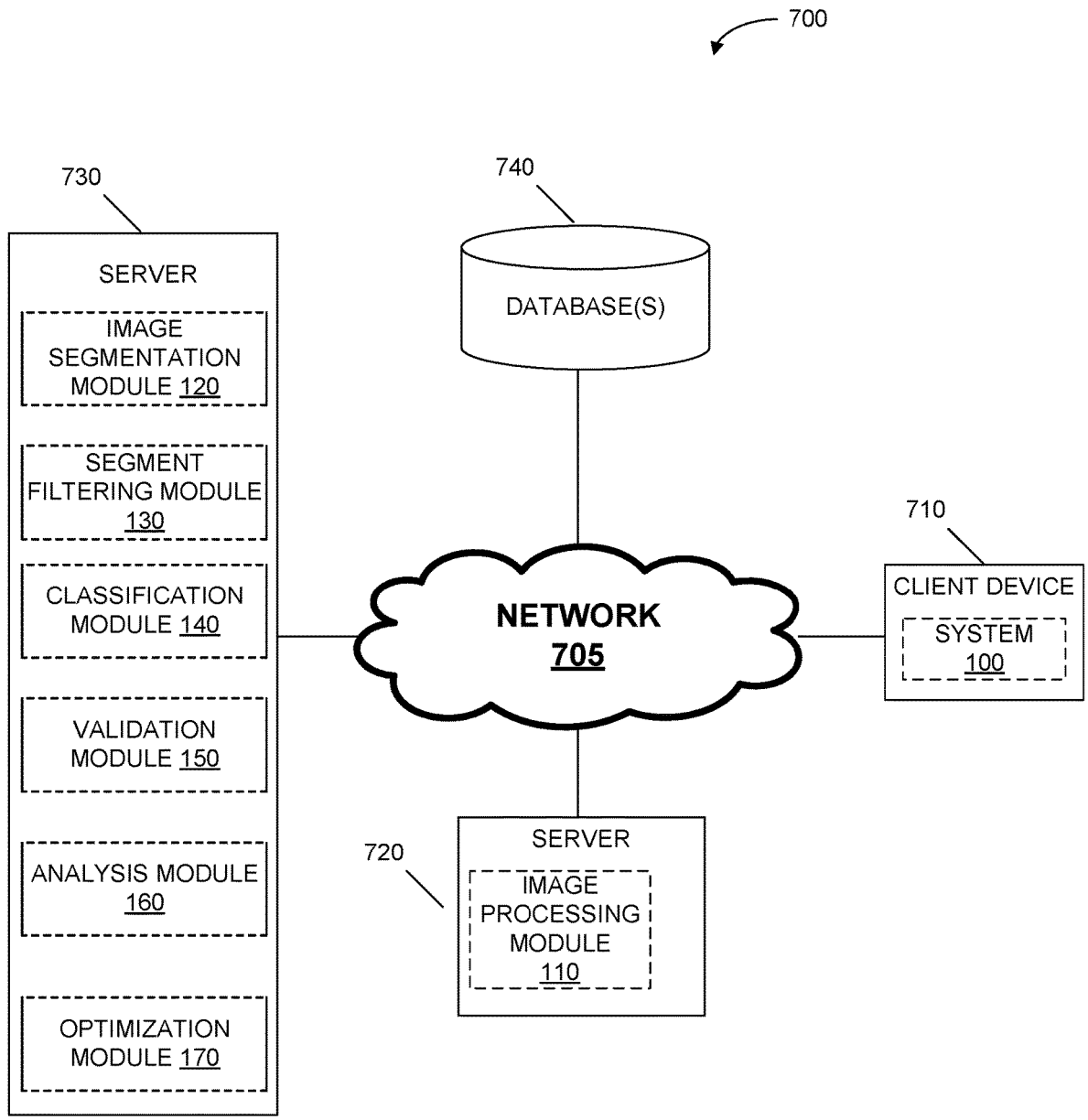
FIG. 7 illustrates a network diagram depicting a system for implementing a distributed embodiment of the contract term classification and optimization system, according to an exemplary embodiment.

FIG. 1 is a block diagram showing a document classification system 100 in terms of modules according to an exemplary embodiment. One or more of the modules may be implemented using device 710, and/or server 720, 730 as shown in FIG. 7. The modules include an image processing module 110, an image segmentation module 120, a segment filtering module 130, a classification module 140, a validation module 150, an analysis module 160, and an optimization module 170. The modules may include various circuits, circuitry and one or more software components, programs, applications, or other units of code base or instructions configured to be executed by one or more processors. In some embodiments, one or more of modules 110, 120, 130, 140, 150, 160, 170 may be included in server 720 and/or server 730. Although modules 110, 120, 130, 140, 150, 160, and 170 are shown as distinct modules in FIG. 1, it should be understood that modules 110, 120, 130, 140, 150, 160, and 170 may be implemented as fewer or more modules than illustrated. It should be understood that any of modules 110, 120, 130, 140, 150, 160, and 170 may communicate with one or more components included in system 700 (FIG. 7), such as client device 710, server 720, server 730, or database(s) 740.

The image processing module 110 may be a software or hardware implemented module configured to process document images of contracts, including cleaning the images, removing noise from the images, aligning the images, and preparing the images for further processing and automatic classification.

The image segmentation module 120 may be a software or hardware implemented module configured to segment each document image into multiple defined smaller segments, and convert each defined segment into corresponding text blocks using optical character recognition (OCR).

The segment filtering module 130 may be a software or hardware implemented module configured to identify relevant segments by analyzing the corresponding text blocks and determining that the segment indicates a contract term. The segment filtering module 130 may also be configured to separate relevant segments into separate or individual contract terms.

The classification module 140 may be a software or hardware implemented module configured to execute a trained machine learning model on the relevant segments of the document images, and automatically classify each of the segments into contract categories and sub-categories. The classification module 140 may also be configured to transmit data relating to the classification of each segment to a client device displaying a user interface. In example embodiments, the classification module 140 is configured to retrain the machine learning model based on feedback received from a user.

The validation module 150 may be a software or hardware implemented module configured to receive input from the client device via the user interface indicating the classification of the segments determined by the classification module 140 is accurate or inaccurate. The validation module 150 is configured to transmit the input as feedback to the classification module 140 to retrain the machine learning model.

The analysis module 160 may be a software or hardware implemented module configured to receive via the user interface indicating the classification of the segments determined by the classification module 140. Analysis module 160 may also be implemented to receive travel data, the travel data may be received by a user interface, in some embodiments it may be queried from a database or from another computing system. Travel data may additionally be stored within classification system 100. The travel data may be of the type listed under Travel Data in Appendix A. For example, travel data may include travel dates, hotel name or identifier, the number of nights spent in the hotel, the airline, car rental dates, car rental company name or identifier, the departure and destination cities, or any of the other information listed under Travel Data in Appendix A. In some embodiments the travel data may be stored in a first table or database.

Optimization information may be used by the system during an optimization module to optimize travel decision making or inform contract negotiations. The optimization may be extracted directly from the travel data or it may be determined based on numerous pieces of travel data. The system may determine what travel data to extract based on the desired optimization or the terms of a particular contract. For example, the travel data may include and sales tax and ticket price, the system may then us this data to generate optimization information, such as Paid Fair. The extracted optimization information may itself be stored in a second table or database. The second table may contain a subset of the travel data, it may contain values that were calculated based on extracted travel data, or it may contain some combination thereof. The optimization information may include any of the information types listed as Optimization Information in Appendix A. In an embodiment, the Optimization Information may be used in an optimization module to produced optimized travel data and/or contract terms.

In an example embodiment, the document classification system 100 can be implemented on one or more computing devices. As a non-limiting example, implementation of the system 100 can take the form of one or more computing devices implemented as one or more physical servers or one or more computing device implementing one or more virtual servers. Hardware utilized for the system 100 can be distributed across logical resources allocated for the system that can be housed in one server, or distributed virtually across multiple pieces of hardware. It will be appreciated that the functionality of the modules of the document classification system 100 described herein may be combined or separated into a lesser or greater number of modules than those described with reference to FIG. 1.

Figure 2:
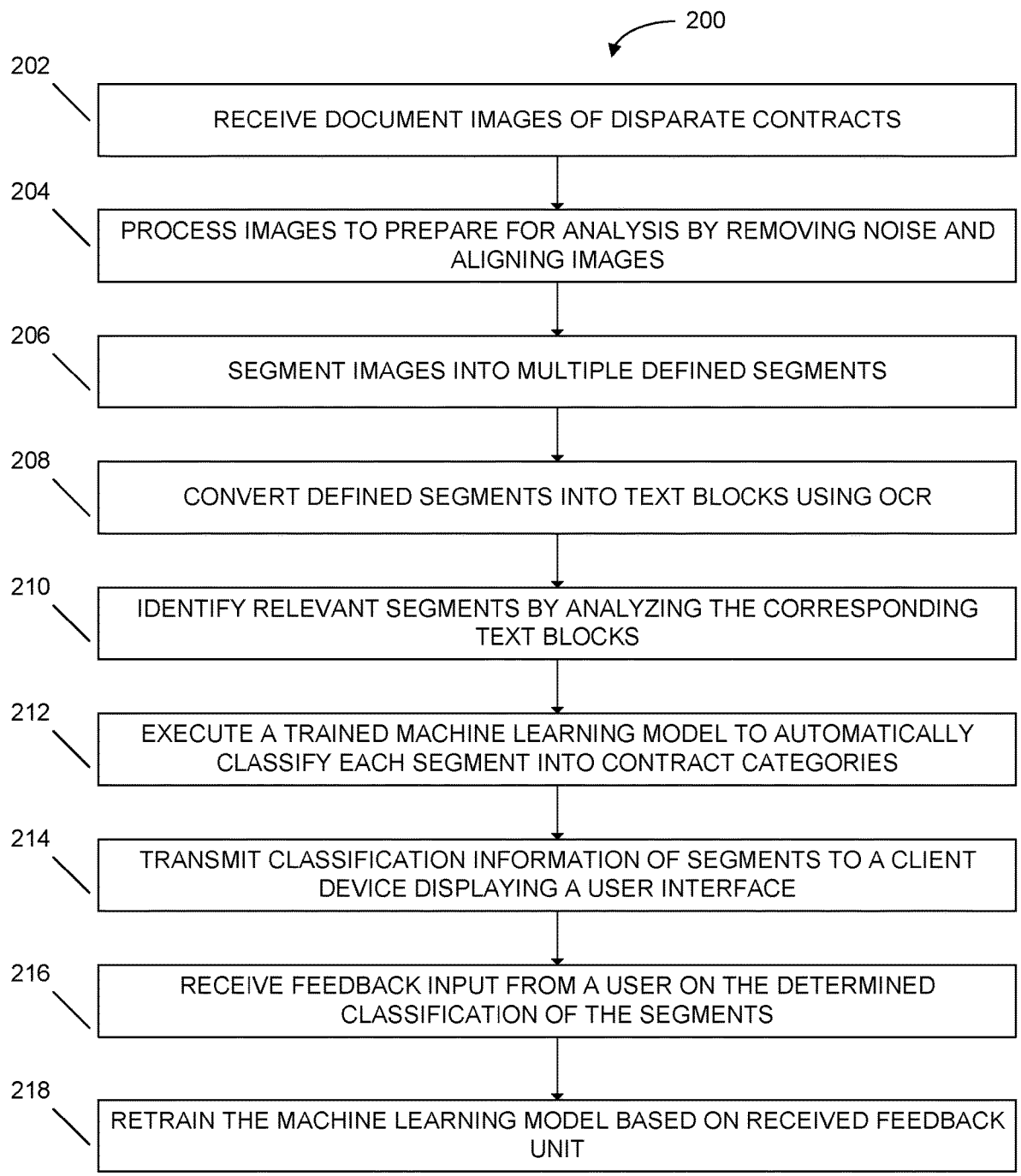
FIG. 2 is a flowchart showing an example method for the contract term classification system, according to an exemplary embodiment.

FIG. 2 is a flowchart showing an example method 200 for the contract classification system, according to an exemplary embodiment. The method 200 may be performed using one or more modules of system 100 described above.

At step 202, the document classification system 100 receives document images of disparate contracts. The images are stored in a database (e.g., database(s) 740). At step 204, the image processing module 110 processes the images to prepare them for further analysis. The image processing module 110 removes noise and aligns images, and prepares them for OCR.

At step 206, the image segmentation module 120 segments images into multiple smaller defined segments. At step 208, the image segmentation module 120 converts the defined segments into text blocks using OCR.

At step 210, the segment filtering module 130 identifies relevant segments by analyzing the corresponding text blocks. The system 100 identifies relevant segments as segments that include text indicating contract terms.

At step 212, the classification module 140 executes a trained machine learning model to automatically classify each segment into contract categories. Example categories include, but are not limited to airline, market, route, ticket type, market share, revenue, purchase requirement, discount, and the like. In an example embodiment, the classification module 140 further classifies each segment and gives it an identifier identifying the category of the data. Other categories and subcategories are possible within the scope of the present invention. The categories may include any of the information types listed under Extracted Contract Information in Appendix A. As discussed herein, the information may be extracted from an image of the contract using OCR and the content of the extracted segments may be categorized by the system. In other embodiments the information and/or categorization may be input by a user. In still further embodiments, the information may be extracted from an image or other file containing the contract, it may be categorized by the system, and the categorization may be confirmed, changed, or entered. In other embodiments the information may be extracted and categorized by the system, a user may then confirm that categorization and/or categorize and segments that were not categorized with a sufficiently high confidence and/or not characterized at all. In some embodiments, any changes or additions to the system categorization may be used by the system to dynamically improve or evolve the efficiency and accuracy of the system's categorization.

In other embodiments the information extracted from the contract may be stored in a first table or database. The location of the information in the table or on the database may be determined based on the category of the extracted information. In other embodiments, the system may extract a number of terms from the first table. This information may be cleaned and stored on a second table or database. In some embodiments the information and/or cleaned information from the first table may be based on the desired optimization and/or the travel data or optimization information. The information stored in the second table or database may then be used in a optimization module. At step 214, the classification module 140 transmits classification information of the segments to a client device (e.g., device 710). The client device displays a user interface. The classification information is displayed in the user on the client device.

At step 216, the validation module 150 receives feedback input from the user via the user interface on the classification of the segments determined by the classification module 140. The feedback input from the user may indicate whether a classification is accurate or inaccurate. In case the classification is inaccurate, the user may also provide the correct classification for a particular text segment containing a contract term. The user may also provide feedback with respect to whether the text segment is relevant or irrelevant (that is, whether the text segment contains a contract term or not).

At step 218, the classification module 140 retrains the machine learning model based on the feedback input received from the user.

Figure 3:
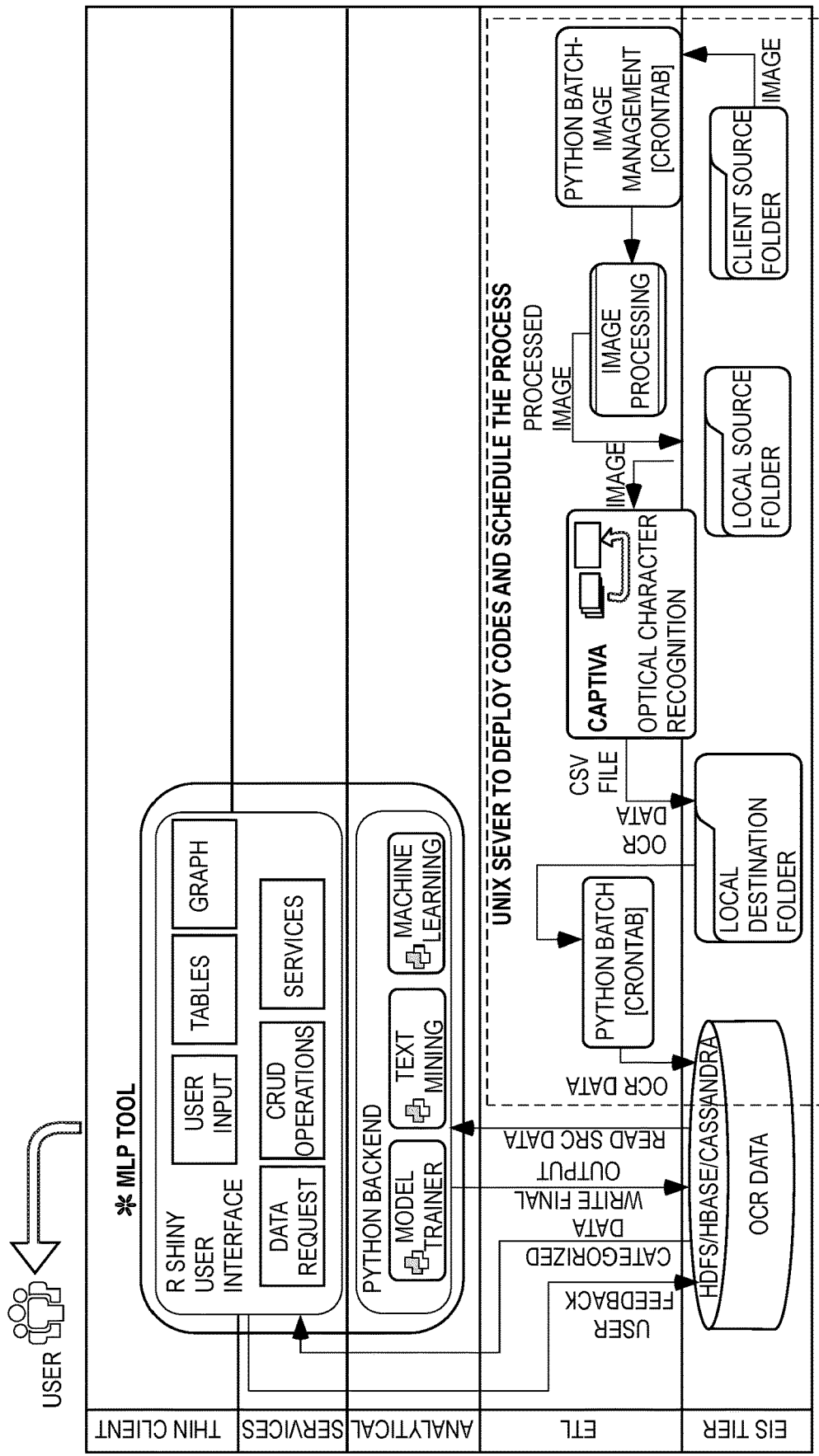
FIG. 3 schematically illustrates an example architecture to implement the contract term classification system, according to an exemplary embodiment.

FIG. 3 schematically illustrates an example architecture to implement the document classification system 100, according to an exemplary embodiment. The document classification system 100 includes a server configured to deploy software code and schedule image processing of document images. In an example embodiment, the system 100 includes a Python backend to perform model training, text mining and machine learning using the input images. In an example embodiment, OCR is performed using software provided by Captiva™. The image is cleaned up during the image processing stage where each section of text/table from the images are segmented to individual blocks of text and are classified into relevant category/subcategory. This output is stored into a database. A user interface is provided as a thin client on a client device to receive user feedback. The user feedback is stored in the database and used to retrain the machine learning model.

Figure 4:
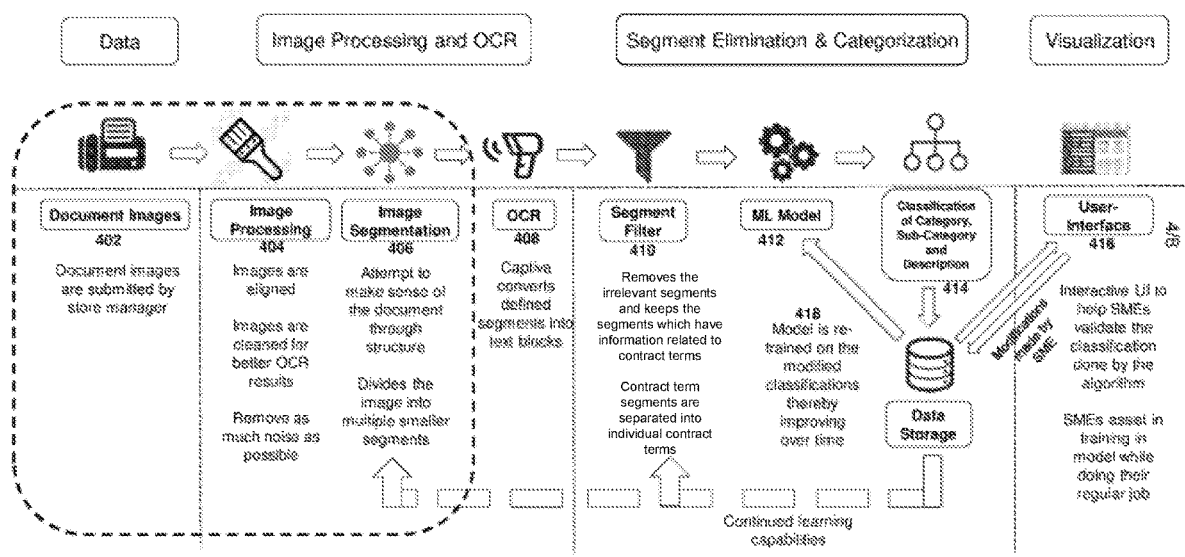
FIG. 4 is a schematic illustrating an example process flow for the contract term classification system, according to an exemplary embodiment.

FIG. 4 is a schematic illustrating an example process flow for the document classification system 100, according to an exemplary embodiment. The process for the document classification system 100 begins at step 402 where document images of contracts are submitted to the system. At step 404, the document images are processed. The image processing includes aligning of the images, cleaning the images for better OCR results, and removing noise from the images.

At step 406, the images are segmented into smaller multiple segments based on structure of the document. At step 408, the defined segments are converted into text blocks using OCR. In an example embodiment, Captiva™ is used to perform OCR on the segments. At step 410, the segments are filtered. The irrelevant segments are removed from analysis, and the relevant segments are kept for analysis. The relevant segments contain information related to the contract terms. The relevant segments containing contract terms are separated into individual terms.

The individual term segments are input to a machine learning model at step 412. At step 414, the machine learning model classifies the relevant segments containing contract terms into categories, sub-categories, and identifiers. The machine learning model analyzes the text within the relevant segments to identify a category, sub-category, and identifier for the segment. At step 416, an interactive user interface is provided on a client device to a user that enables users to validate the classification of the relevant segments performed by the system 100. The users provide feedback via the user interface to correct or improve the classification of contract term segments. At step 418, the machine learning model is retrained based on the feedback provided by the users. It should be appreciated that other types of information other than contract terms may also be classified by the system.

Figure 5:
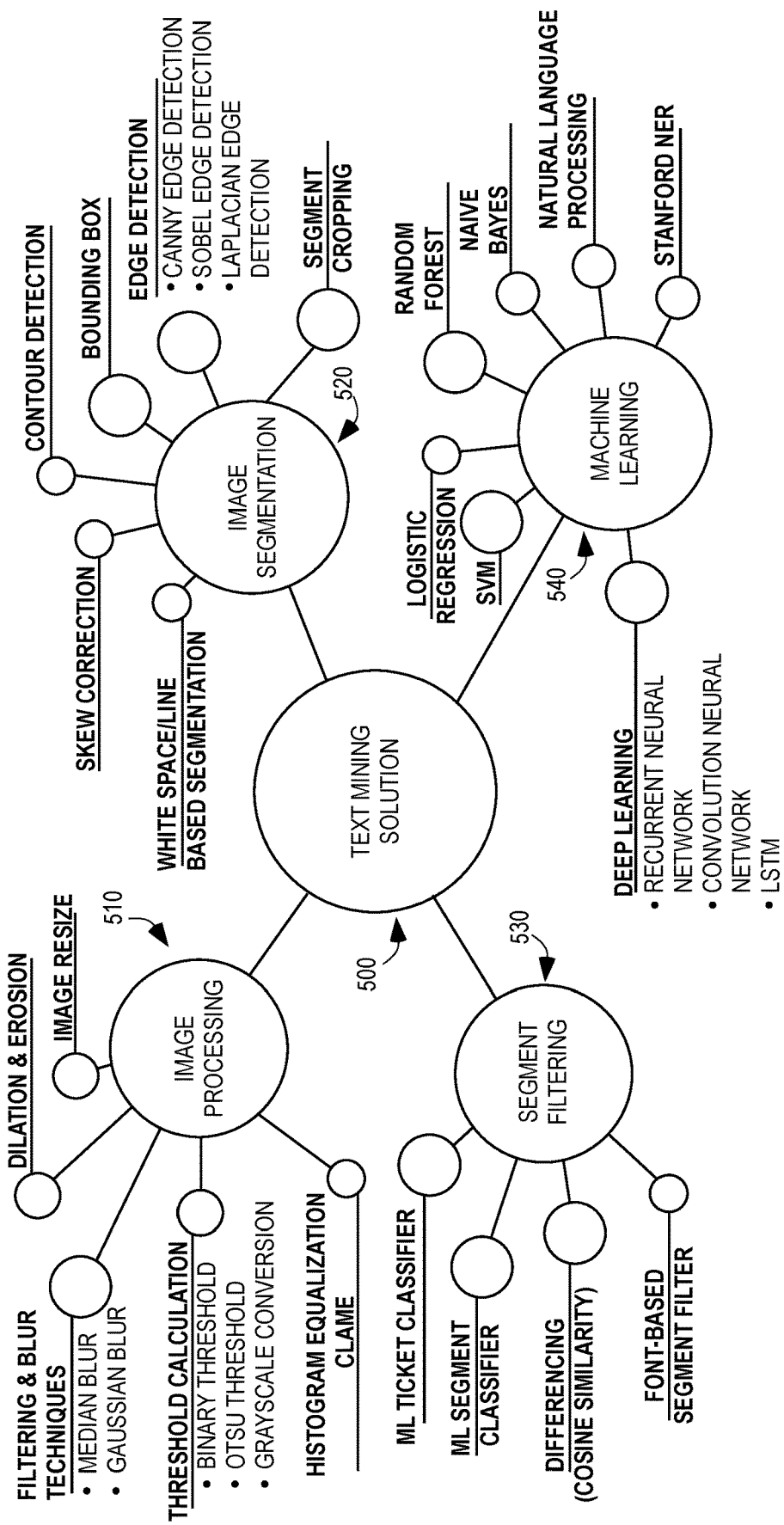
FIG. 5 is a schematic illustrating example data processing components for the contract term classification system, according to an exemplary embodiment.

FIG. 5 is a schematic illustrating example data processing components for the contract term classification and optimization system 100, according to an exemplary embodiment. Text mining solution 500 includes various components, for example, image processing 510, image segmentation 520, segment filtering 530, and machine learning 540. Each component shown in FIG. 5 may be a software or hardware implemented component and may be configured to perform various functionalities described herein.

In an example embodiment, the image processing component 510 cleans up document images, removes noise, and prepares images for further processing. For example, the image processing component 510 implements image resizing techniques, dilation and erosion image processing techniques, filtering and blur image processing techniques (including median blur and Gaussian blur), threshold calculation image processing techniques (including binary threshold, Otsu threshold, grayscale conversion), and adaptive histogram equalization (including contrast limited AHE). In some embodiments, the functionalities of the image processing component 510 described here are performed by the image processing module 110 described in relation to FIG. 1.

In an example embodiment, the image segmentation component 520 analyzes document images to further comprehend its content and divides the image into multiple smaller segments. For example, the image segmentation component 520 implements white space and line space based segmentation, skew correction techniques, contour detection, bounding box techniques, edge detection (including canny edge detection, sobel edge detection, laplacian edge detection), and segment cropping. In some embodiments, the functionalities of the image segmentation component 520 described here are performed by the image segmentation module 120 described in relation to FIG. 1.

In an example embodiment, the segment filtering component 530 analyzes the segments created by image segmentation steps, and filters the segments to identify relevant segments that indicate a contract term. For example, the segment filtering component 530 implements machine learning ticket classifier techniques, machine learning segment classifier techniques, differencing techniques (including cosine similarity), and font-based segment filtering. In some embodiments, the functionalities of the segment filtering component 530 described here are performed by the segment filtering module 130 described in relation to FIG. 1.

In an example embodiment, the machine learning component 540 classifies the filtered segments into contract categories using various machine learning techniques. For example, the machine learning component 540 implements support vector machine (SVM) model, logistic regression, random forest decision tree learning, naïve bayes, natural language processing, Stanford natural language processing (Stanford NER), and deep learning neural networks (including recurrent neural network, convolution neural network, long short-term memory (LSTM)). In some embodiments, the functionalities of the machine learning component 540 described here are performed by the classification module 140 described in relation to FIG. 1.

Figure 6A:
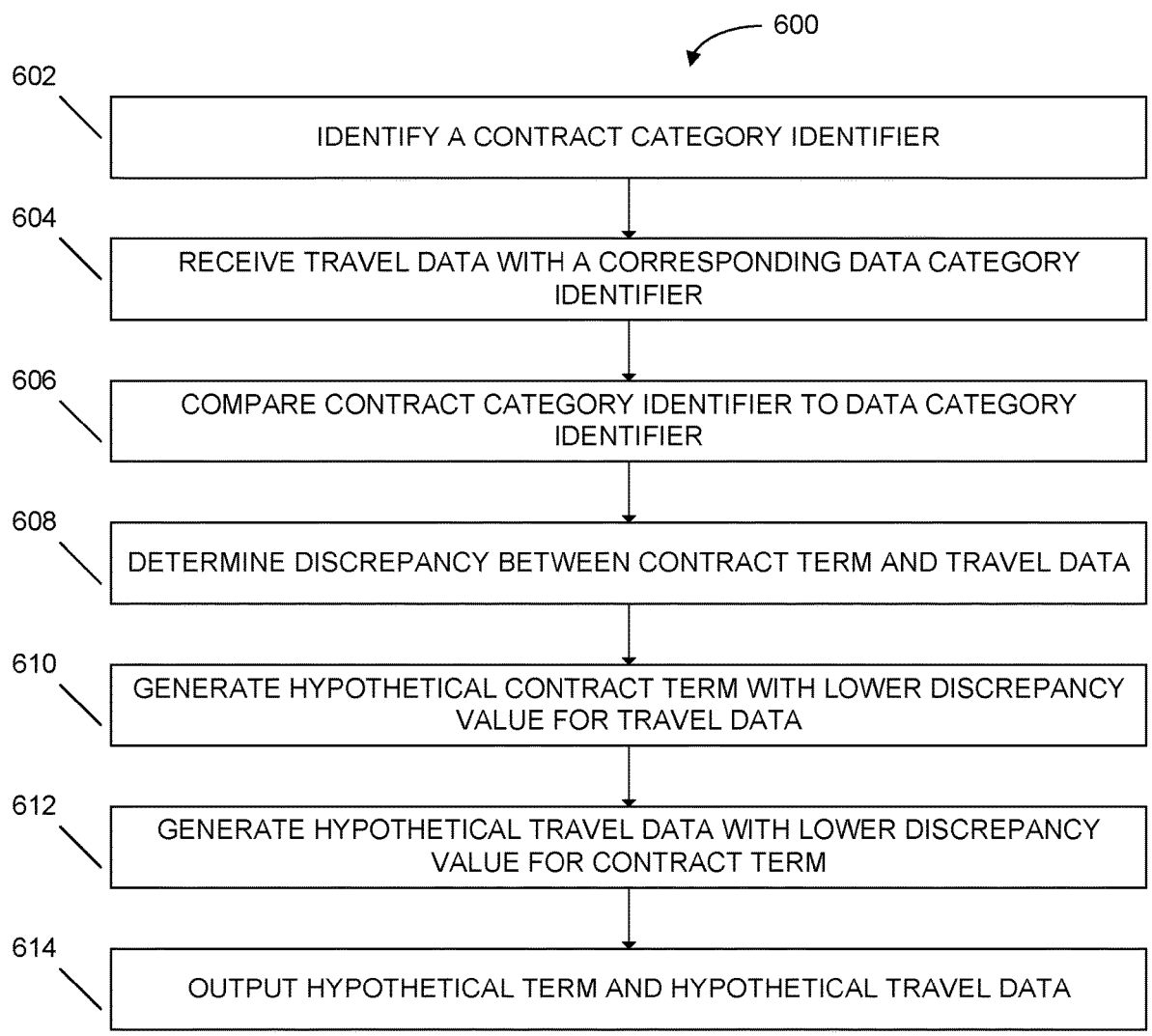
FIG. 6A is a flowchart showing an example of the optimization system, according to an exemplary embodiment.

FIG. 6A shows a flowchart showing an example method 600 for the contract optimization system, according to an exemplary embodiment. The method 600 may be performed using one or more modules of system 100 described above. The process may follow step 212 in contract classification system 200 and/or in combination with method 620 described below. At 602 the optimization method may identify a contract category identifier for a segment. The contract identifier may identify the type of contract term defined in the segment, for example, the contract identifier may identify that the contract term is for a certain route on a particular airline. At 604 the method may receive travel data, the travel data may be stored on a database or input by a user in some embodiments. In some embodiments the method may query a database for travel data, the query may be for data having a specific data category identifier. At 606 the method may compare the travel data to the contract term having a corresponding contract category identifier. In some embodiments several pieces of travel data may be aggregated and compared to the contract term.

At 608 the method generates a discrepancy value between the travel data in the contract term. For example, in an embodiment, the contract term may specify a number of trips for a certain airline and route, the method may compare the number of trips purchased on the airline and route and generate a discrepancy value that indicates the difference between the number of trips purchased and the number of trips identified in the contract for that route. At 610 the method may generate a hypothetical contract term with a lower discrepancy value. In some embodiments the method may generate the hypothetical contract term in part based on additional travel data or contract terms.

At 612 the method may generate a hypothetical travel data with a lower discrepancy value. In some embodiments the method may generate the hypothetical contract term in part based on additional travel data or contract terms. For example, in some embodiments the method may look at travel data for the same route on a different airline, or for a different ticket type, to determine the most advantageous hypothetical travel data.

At 614 the method may output the hypothetical contract term and/or the hypothetical travel data to a user interface. In some embodiments the method may also output one or more of the discrepancy values of the contract term, the travel data, the hypothetical travel data, and/or the hypothetical contract term. In still further embodiments, the method may output a value associated with the discrepancy value, for example, the price savings resulting from the discrepancy values. It may also output additional hypothetical contract terms, for example, the method may output a suggested change to a different contract to improve multiple or total discrepancy among various contract terms and travel data.

Figure 6B:
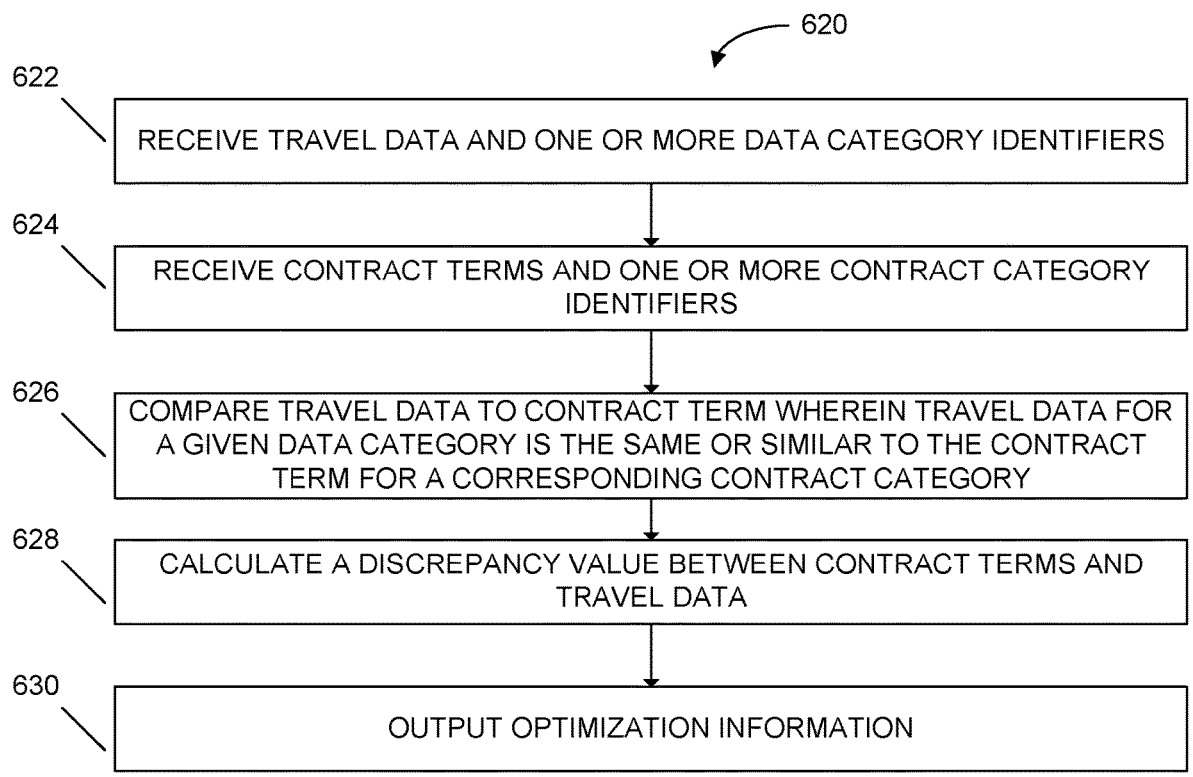
FIG. 6B is a flowchart showing an example of the optimization system, according to an exemplary embodiment.

FIG. 6B shows a flowchart showing an example method 620 for the contract optimization system, according to an exemplary embodiment. The method 620 may be performed using one or more modules of system 100 described above. The process may follow step 212 in contract classification system 200 or in combination with method 600 described herein. At 622 the method receives travel data and one or more data category identifiers. The method may query the travel data from a database or the travel data may be input by a user or stored locally. The travel data may represent previous travel or trips that have been made or it may represent future travel or trips. The method may additionally receive one or more data category identifiers, in an embodiment the travel data may include a route information identified by a route data category identifier, a discount rate identified by a discount rate data category identifier, a ticket type identified by a ticket type data category identifier, the airline identified by an airline data category identifier, or any other number of data points.

At 624 the method may receive contract terms and one or more contract category identifiers. The method may query the contract terms from a database or the contract terms may be input by a user or stored locally. The contract terms may relate to one or more individual terms that may be identified by a contract category identifier the contract terms may include route information identified by a route contract category identifier, a discount rate identified by a discount rate contract category identifier, a ticket type identified by a ticket type contract category identifier, the airline identified by an airline contract category identifier, or any other number of contract terms. In some embodiments the method may query contract terms based on the contract term that is similar or the same to a data point in the travel data. For example, if the travel data designates a specific route, the method may query contract terms that have that same route. At 626 the method may then compare the contract terms to the travel data.

At 628 the method may calculate the discrepancy value between the travel data and the contract terms for a number of different contracts. For example, in an embodiment, the travel data may be compared to the terms of a first contract and a first discrepancy value may be generated, the same travel data may then be compared to the terms of a second contract and a second discrepancy value may be generated. The first and second discrepancy values may also be compared to each other. Similarly, in other embodiments the method may calculate the discrepancy value between a contract term and multiple sets of travel data. For example, a contract may be compared to one set of travel data and a first discrepancy value may be generated, and the same contract may be compared to a second set of travel data and a second discrepancy value may be created. The first and second discrepancy value may themselves be compared. The contract terms and travel data may be actual, historical, or hypothetical.

At 630 the method may output optimization information. The optimization information may take many forms, in one embodiment, the optimization information may be one or more contract terms for a given set of travel data. For example, for a given set of travel data for a certain ticket type, the optimization information may include the discount rate for that ticket type under a first contract and a discount rate for that ticket type under a second contract. The first and/or second contract may currently be in place or it may include potential new contract terms. The contract terms output may also be determined based, in part, on a generated discrepancy value. In other embodiments, the discrepancy values may themselves be output. In other embodiments, the optimization information may include travel data that may have a lower discrepancy value for given contract terms or travel data resulting in a higher discount rate or total savings than another set of travel data. For example, if there is a 50% discount on A type tickets for a certain route and a 75% discount for B type tickets for that route, the optimization information may include travel data with increased number of B type tickets. The optimization information may also include one or more discrepancy values and/or any price differentials related to the optimization information. In another example, if there is a 50% discount on A type tickets for a certain route and a 75% discount for B type tickets for that route and the travel data shows that 100 A type tickets and 50 B type tickets were purchased, the optimization information may include an instruction to negotiate for a higher discount on A type tickets in exchange for a lower discount on B type tickets.

In some embodiments, this information may be accessed remotely by a user through a third party platform, for example, an airline company may be able to use a third party platform, such as PRISM, to determine what percentage of flights for a particular route were purchased from the airline, in some embodiments the user may be able to determine the market share of a particular route, ticket type, etc. are purchased from a particular airline. In still further embodiments, the user may be able to determine whether the market share purchased under a particular contractual agreement complies with the terms of the contract.

FIG. 7 illustrates a network diagram depicting a system 700 for implementing a distributed embodiment of the contract classification and optimization system, according to an example embodiment. The system 700 can include a network 705, client device 710, multiple servers, e.g., server 720 and server 730, and database(s) 740. Each of components 710, 720, 730, and 740 is in communication with the network 705.

In an example embodiment, one or more portions of network 705 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The client device 710 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, mini-computers, and the like. The device 710 can include one or more components described in relation to computing device 800 shown in FIG. 8. The device 710 may be used by a user to provide feedback on the classified document images. Exemplary user interface 600 may be displayed on the device 710 to collect feedback and user input, and the user may indicate that the classification is accurate or inaccurate.

The device 710 may connect to network 705 via a wired or wireless connection. The device 710 may include one or more applications such as, but not limited to a web browser application, and the like. The device 710 may also include one or more components of system 100 described in relation to FIG. 1, and may perform one or more steps described in relation to FIG. 2 or FIG. 9.

The server 720 may include one or more processors and the image processing module 110 described in relation to FIG. 1. The server 720 may be configured to process images, clean up images, remove noise and prepare the images for OCR and segmentation. The server 720 may retrieve document images from the database(s) 740.

The server 730 may include one or more processors, and may include the image segmentation module 120, the segment filtering module 130, the classification module 140, the validation module 150, the analysis module 160, and/or the optimization module 170 described in relation to FIG. 1.

Each of the servers 720, 730 and the database(s) 740 is connected to the network 705 via a wired or wireless connection. The server 720, 730 includes one or more computers or processors configured to communicate with the client device 710, and database(s) 740 via network 705. The server 720, 730 hosts one or more applications, websites or systems accessed by the device 710 and/or facilitates access to the content of database(s) 740. Database(s) 740 comprise one or more storage devices for storing data and/or instructions (or code) for use by the device 710 and the servers 720, 730. The database(s) 740, and/or the server 720, 730 may be located at one or more geographically distributed locations from each other or from the device 710. Alternatively, the database(s) 740 may be included within the server 720, 730.

Figure 8:
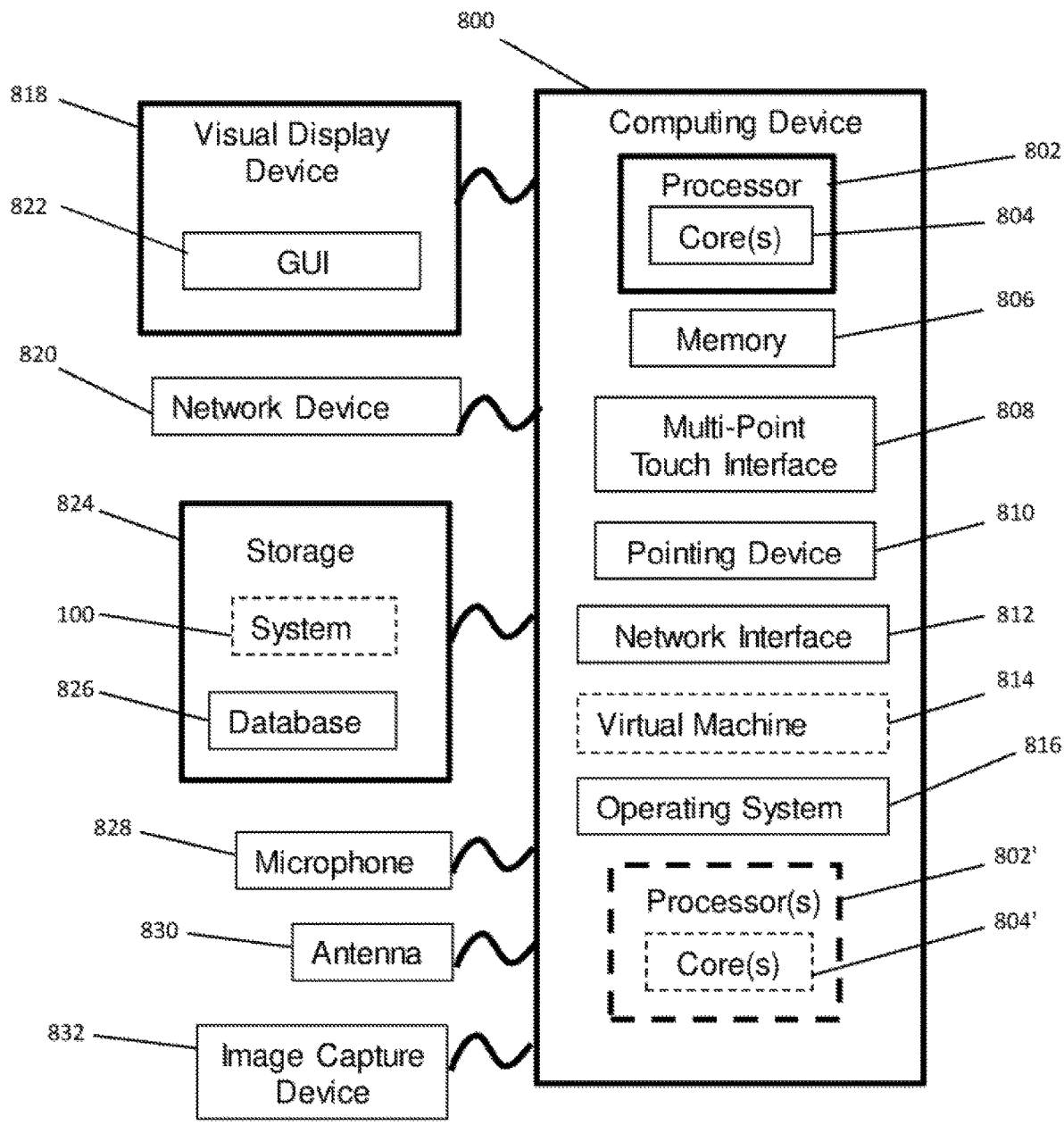
FIG. 8 is a block diagram of an exemplary computing device that can be used to implement exemplary embodiments of the contract term classification and optimization system described herein.

FIG. 8 is a block diagram of an exemplary computing device 800 that may be used to implement exemplary embodiments of the automated document classification system 100 described herein. The computing device 800 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 806 included in the computing device 800 may store computer-readable and computer-executable instructions or software for implementing exemplary embodiments of the automated document classification system 100. The computing device 800 also includes configurable and/or programmable processor 802 and associated core 804, and optionally, one or more additional configurable and/or programmable processor(s) 802' and associated core(s) 804' (for example, in the case of computer systems having multiple processors/cores), for executing computer-readable and computer-executable instructions or software stored in the memory 806 and other programs for controlling system hardware. Processor 802 and processor(s) 802' may each be a single core processor or multiple core (804 and 804') processor.

Virtualization may be employed in the computing device 800 so that infrastructure and resources in the computing device may be shared dynamically. A virtual machine 814 may be provided to handle a process running on multiple processors so that the process appears to be using only one computing resource rather than multiple computing resources. Multiple virtual machines may also be used with one processor.

Memory 806 may include a computer system memory or random access memory, such as DRAM, SRAM, EDO RAM, and the like. Memory 806 may include other types of memory as well, or combinations thereof.

A user may interact with the computing device 800 through a visual display device 818, such as a computer monitor, which may display one or more graphical user interfaces 822 that may be provided in accordance with exemplary embodiments. The computing device 800 may include other I/O devices for receiving input from a user, for example, a keyboard or any suitable multi-point touch interface 808, a pointing device 810 (e.g., a mouse), a microphone 828, and/or an image capturing device 832 (e.g., a camera or scanner). The multi-point touch interface 808 (e.g., keyboard, pin pad, scanner, touch-screen, etc.) and the pointing device 810 (e.g., mouse, stylus pen, etc.) may be coupled to the visual display device 818. The computing device 800 may include other suitable conventional I/O peripherals.

The computing device 800 may also include one or more storage devices 824, such as a hard-drive, CD-ROM, or other computer readable media, for storing data and computer-readable instructions and/or software that implement exemplary embodiments of the automated document classification system 100 described herein. Exemplary storage device 824 may also store one or more databases for storing any suitable information required to implement exemplary embodiments. For example, exemplary storage device 824 can store one or more databases 826 for storing information, such scanned document images, processed images, segmented images and text blocks, classification information for document images, validation/feedback from user, and/or other information to be used by embodiments of the system 100. The databases may be updated manually or automatically at any suitable time to add, delete, and/or update one or more items in the databases.

The computing device 800 can include a network interface 812 configured to interface via one or more network devices 820 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 800 can include one or more antennas 830 to facilitate wireless communication (e.g., via the network interface) between the computing device 800 and a network. The network interface 812 may include a built-in network adapter, network interface card, PCMCIA network card, card bus network adapter, wireless network adapter, USB network adapter, modem or any other device suitable for interfacing the computing device 800 to any type of network capable of communication and performing the operations described herein. Moreover, the computing device 800 may be any computer system, such as a workstation, desktop computer, server, laptop, handheld computer, tablet computer, mobile computing or communication device, ultrabook, internal corporate devices, or other form of computing or telecommunications device that is capable of communication and that has sufficient processor power and memory capacity to perform the operations described herein.

The computing device 800 may run operating system 816, such as versions of the Microsoft® Windows® operating systems, the different releases of the Unix and Linux operating systems, versions of the MacOS® for Macintosh computers, versions of mobile device operating systems (e.g., Apple® iOS, Google® Android™, Microsoft® Windows® Phone OS, BlackBerry® OS, and others), embedded operating systems, real-time operating systems, open source operating systems, proprietary operating systems, or other operating systems capable of running on the computing device and performing the operations described herein. In exemplary embodiments, the operating system 816 may be run in native mode or emulated mode. In an exemplary embodiment, the operating system 816 may be run on one or more cloud machine instances.

The following description is presented to enable any person skilled in the art to create and use a computer system configuration and related method and article of manufacture to automatically classify contracts. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

APPENDIX A

Travel Data
Internal reporting number/Non applicable—is not used in reporting
Ticketing bucket—purchase ticket within a time period
On-line, offline, agent assist (CODE)
Internal reporting ID/Non applicable—is not used in reporting
Alliance partner the Airline, Hotel (Super Chain), Car belong to
Ticket approver name, not mandatory in all countries
Air Coupon Level reporting only
Internal reporting ID Reason included by Barter credit
Fare before taxes
Internal reporting code
Entity or group that is completing the booking
Date a booking is entered in system
Internal number for reporting to IATA
On-line, offline, agent assist (Definition of Code)
Internal reporting ID
Number of days car is rented
Code associated with Car Agency
Car type, SUV, Luxury, Intermediate, Economy, Compact/Non applicable—is not used in reporting
Passive travel segments
CO2 kilometers
Number provided by supplier confirming booking (Hotel & Car)
Air Coupon Level
Area that is charged for booking
Two digit code for country that booked the ticket
Airport Code
Air Coupon Level, description of coupon (i.e., 1=used, 0=exchange, −1=refund)
Air Coupon Level, arrival date of the coupon traveling on
Air Coupon Level, arrival time of the coupon traveling on
Air Coupon Level, departure date of the coupon traveling on
Air Coupon Level, departure time of the coupon traveling on
Air Coupon Level, number of coupons for booking (i.e., 1 coupon for each travel segment)
Air Coupon Level, letter code associated by airline (i.e., K=economy fare bucket)
Two digit credit card associate with payment for booking
Credit card number used to pay for booking
Source of reporting
Number of days to when a refund is submitted
Area that is charged for booking
Air departure date
Air departure day of week (i.e., Monday, Tuesday)
Destination Airport Code
Destination Airport Name
Destination City Name
Destination Country
Destination Region (i.e., North America, South America, Far East, Europe)
Destination State or Province Code
Destination Zip Code
Yes or No direct billed was used
Division that is charged for booking
Car, City car was dropped off
Car, City name car was dropped off
Car, Country name car was dropped off
Car, Region name car was dropped off
Car, Time car was dropped off
E-ticket designator (i.e., Yes or No)/Non applicable—is not used in reporting Reason for booking exchanged
Yes or No if an exchange was processed
Code assigned by the airlines related to pricing buckets
Calculation applied by airline for each ticket coupon
Flight description (Charter, Blockspace)
Total number of hours & minutes per booking
Airline flight number
Airline code flown on
How booking was paid (Credit Card, Check, Invoice, etc.)
Airline system booking is made from
Local in country tax incurred for each booking (typically added to total fare)
Hotel, code associated with hotel property
First Level of hierarchy where applicable
Second Level of hierarchy where applicable
Third Level of hierarchy where applicable
Fourth Level of hierarchy where applicable
Fifth Level of hierarchy where applicable
Reason hotel was not booked at same time as air
Hotel or Car booking only, no airline associated
Hotel Super Chain Code
Hotel Super Chain Name (International Hotel Group, Marriott)
Country where hotel is located/Non applicable—is not used in reporting
Hotel Phone Number/Non applicable—is not used in reporting
State where hotel is located
Local in country tax incurred for each booking (typically added to total fare)
Hotel check-in date
Invoice number associated with each individual booking/Non applicable—is not used in reporting
Date ticket was issued (purchased) or date hotel/car booking made
Country where booking was issued
Kilometers traveled per booking
Local in country currency code (USD, CNY, INR, etc.)
Hotel/Car daily rate in local currency amount
In country fare paid in local currency/Non applicable—is not used in reporting
Lowest fare offered within country policy/Non applicable—is not used in reporting
Two digit airline code the ticket is issued on
Airline name associated with airline code
Large Meeting/Relocation account code
Group contract ID for meetings
Closest metro city code to the Hotel city reservation
Lost savings calculated by Travel policy
Invoice Date
Closest Airport code to the Hotel city reservation
Closest Airport name to the Hotel city reservation
Closest metro city to the Hotel city reservation
Coupon Level next leg of air segment
Number of coupons included in the ticket
Number of rooms or cars reserved on a booking
Number of travel segments in a booking (i.e., XNA to DFW=1 sub trip)
Origin & Destination Airport Code's
Online Booking Tool Internal number for reporting
Type of Online Booking Tool associated
Online Booking Tool Vendor Name
Online Booking Tool Internal number for reporting
Airline Code that is operating the current flight
Airline Name that is operating the current flight
Internal name for reporting
Internal number for reporting
Airport code for city the flight originated from
Airport name for city the flight originated from
City name flight originated from
Country flight originated from
Region flight originated from
Origin State or Province Code
Internal number for reporting
Original date air ticket was issued
Original fare paid for air ticket that was issued
Original airline ticket number
More than normal government taxes charged to an airline ticket
Fare paid with taxes
Percentage of savings lost based on travel policy Percentage of potential savings based on travel policy
Percentage of savings achieved based on airline discount
City name rental car is picked up in
Country name rental car is picked up in
Date rental car is pick up
Region name rental car is picked up in
Time rental car is pick up by
Passenger name record (numbers & letters)
Transaction Fee's charged
Achieved or missed savings that could have occurred
Code associated with ticket class
Type of product booked (Air, Rail, Car, Hotel, etc.)
Rate type (daily, weekly, monthly)
Number of days associated with daily, weekly, monthly
Rate type associated with contract
Reason code for missed savings global (local codes translate into global codes)
Reason code description for missed savings global
Reason code for missed savings local that translates into the global codes
Reason code description for missed savings local that translates into the global codes
Reason code for realized savings global (local codes translate into global codes)
Reason code description for realized savings global
Reason code for realized savings local that translates into the global codes
Reason code description for realized savings local that translates into the global codes
Associated code for realized savings (Internal number for reporting)
Realized savings achieved from airline discount
Fare prior to the airline discount
Non applicable—is not used in reporting
Car rental rate charged per day
Hotel Check-out Date
Car Drop-off Date
Ticket Return Date
Number nights the Hotel room is booked for
Hotel rate that is charged per day
Type of Hotel Room (Single, Double, Queen, King)
Type of airline trip booked (one-way or round-trip)
Type of class associate with airline booking (economy, business, first)
Type of code associated with airline booking (economy, business, first)
Store or Club number for reservation booked
Hotel street address that is booked
Miles for the sub trip flown (i.e. XNA to DFW=300 miles)
Non applicable—is not used in reporting
Airline Supplier associated with the booking (American Airlines, United, etc.)
Hotel Property Name (i.e., Holiday Inn)
Rental Car Name (i.e., Hertz, National)"
Total tax charged for airline ticket booked
Class of service associated with the Ticket (2nd level, Premium economy ticket, etc.)
Class description associated with the Ticket
Ticket coding that designates a discount to the airlines based on our contract
Ticket description (Original Issued, Exchanged, Refund, etc.)
Number assigned to the ticket by airline
Total paid fare for all coupons including taxes
Ticket route including all connections and layovers (i.e., XNA/DFW DFW/XNA)
Actual description of ticket (Active=Normal, Exchange=Exchange, Refund=Refund, etc.)
Ticket used (1=Original Issued, 0=Exchanged, −1=Refund, etc.)
Number associated with where the ticket was issued (i.e., internal number for reporting)
Total estimated cost of Hotel or Rental Car including taxes
Total Hotel estimated charges including taxes
Total travel time including connection/layover
Ticket coding that designates a discount to the airlines based on our contract
Internal number for reporting
Ticket used (Original Issued, Exchanged, Refund, etc.)
Travel Meeting Description
Intercontinental, Domestic, Continental
Passenger name on booking
Trip Codes (i.e., Club Visit, Training, Conference)
Air miles traveled per coupon
Number of days traveled on the booking
Intercontinental, Domestic, Continental
Unique employee ID (i.e., user ID or numbers)
Airline that the ticket was issued on
Airline name that the ticket was issued on
Unique airline number associated with airline service
Employee associated with booking
Number associated with Passenger
Year booking was made
Optimization Information
Reporting code
Issuing country name
Traveler name
Airline alliance
Validating airline
Supplier name
Travel type
Product type description
E-ticket
Action code
Vendor code
Agent Assist Reason Code
Tickets Used
Paid fare
Reference fare
Realized savings
Percentage realized savings
Lowest fare
Missed savings
Percentage missed savings
Potential savings
Percentage potential savings
Economy comparison fare
Reason code missed local
Reason code missed local description
Reason code realized local
Reason code realized local description
Reason code missed global
Reason code missed global description
Reason code realized global
Reason code realized global description
Base fare
Tax
Local sales tax
Other tax
Point of sale fee
Main airline
Service class code
Service class Ticket class
Ticket class description
Predominant ticket class
Fare basis code
Air booking code
Tour code
Ticket designator
Ticket number
Booking date
Invoice number
Issue date
Ticket departure date
Ticket return date
Trip days
Advance ticketing
Advance booking
Ticket routing
Origin destination airport pair
Origin airport code
Origin city name
Origin country
Origin region
Destination airport code
Destination city name
Destination country
Destination region
Routing type
Number of sub-trips
Trip miles
Sub trip miles
Flight duration
Total travel time
Trip type
Transaction type
Ticket status
Days to refund
Branch ID
Agent ID
Booking internal number
Ticketing internal number
Back office ID
Form of payment
Credit card code
Credit card number
Passenger Name Record
Global Distribution System
Travel purpose
Account number
Local currency code
Local paid fare
Carbon footprint
Kilometers
Main airline name
Ticket issued
Transaction count
Base reporting name
Booking method
Number of coupons
Organization ID
Organization
Original issue date
Original paid fare
Original ticket number
Origin state province code
Destination state province code
Month
Year
Booking date time
Issue date time
Ticket departure date time
Ticket return date time
Original issue date time
Extracted Contract Terms
Market pair
Market exclusion
Contract
Start date
Contract
Source
Destination
Term name
Point of Sale
End date
Service class
Market share
Discount
Airline

What is claimed is:

1. A system for automatically analyzing contracts and travel data, the system comprising:
a database storing a plurality of document images of disparate contracts; and
a server equipped with one or more processors and in communication with the database, the server configured to execute an image processing module, an image segmentation module, a segment filtering module, classification module, an analysis module; and an optimization module, wherein the image processing module when executed:
removes noise from each of the plurality of document images;
aligns each of the plurality of document images; and
prepares each of the plurality of document images for optical character recognition (OCR);
wherein the image segmentation module when executed:
segments each of the plurality of document images into multiple defined segments, where the segments are smaller than a corresponding document image;
converts each of the defined segments into corresponding text blocks using OCR;
wherein the segment filtering module when executed:
identifies relevant segments by analyzing the corresponding text blocks and determining that the segment indicates a contract term;
wherein the classification module when executed:
executes a trained machine learning model on the relevant segments of each of the plurality of document images;
automatically classifies each of the plurality of document images into a contract category;
generates a contract category identifier corresponding to the contract category; and
transmits the contract term and the contract category identifier of each of the plurality of document images to a client device displaying a user interface;
wherein the analysis module when executed:
receives travel data and a data category identifier;
receives the contract term and the contract category identifier;
compares the contract term to the travel data if the data category identifier corresponds to the contract category identifier and generates a discrepancy value; and wherein the optimization module when executed:
  generates hypothetical travel data with a discrepancy value that is less that the discrepancy value for the contract term;
  generates a hypothetical contract term with a discrepancy value that is less than the discrepancy value for the travel data; and
  outputs the hypothetical travel data and the hypothetical contract term to a user device.

2. The system of claim 1, wherein the trained machine learning model is a deep learning neural network model.

3. The system of claim 1, wherein the trained machine learning model is a naïve B ayes classifier model.

4. The system of claim 1, wherein the trained machine learning model is a natural language processing model.

5. The system of claim 1, wherein the trained machine learning model is a tree-based classifier model.

6. The system of claim 1, wherein the trained machine learning model is a logistic regression model.

7. The system of claim 1, wherein the trained machine learning model is a support vector machine model.

8. The system of claim 1, wherein one or more of the image processing module and optimization module when executed implements threshold calculation techniques.

9. The system of claim 1, wherein one or more of the image processing module and optimization module when executed implements dilation and erosion techniques.

10. The system of claim 1, wherein the segment filtering module when executed implements font-based segment filtering.

11. The system of claim 1, wherein the image segmentation module when executed implements segmentation based on white space and line space in the document images.

12. The system of claim 1, wherein the classification module further automatically classifies each of the document images into a sub-category.

13. A method for automatically analyzing contract and travel data, the method comprising:
  receiving a plurality of document images of disparate contracts;
  storing the plurality of document images in a database;
  removing noise from each of the plurality of document images;
  aligning each of the plurality of document images;
  preparing each of the plurality of document images for optical character recognition (OCR);
  segmenting each of the plurality of document images into multiple defined segments, where the segments are smaller than the corresponding document image;
  converting each of the defined segments into corresponding text blocks using OCR;
  identifying relevant segments by analyzing the corresponding text blocks and determining that the relevant segments indicate a contract term;
  executing a trained machine learning model on the relevant segments of each of the plurality of document images;
  automatically classifying each of the plurality of document images into a contract category;
  generating a contract category identifier corresponding to the contract category;
  transmitting the contract term and the contract category identifier of each of the plurality of documents images to a client device displaying a user interface
  receiving travel data and a data category identifier;
  determining if the data category identifier corresponds to the contract category identifier and comparing the travel data to the contact term to generate a discrepancy value; generating hypothetical travel data with a discrepancy value that is less that the discrepancy value for the contract term; generating a hypothetical contract term with a discrepancy value that is less than the discrepancy value for the travel data;
  generating optimization information based on the contract terms and travel data; and
  outputting the optimization information to the user device, wherein the optimization information includes the hypothetical travel data and the hypothetical contract term.

14. The method of claim 13, wherein the optimization information includes travel data optimized to the contract terms.

15. The method of claim 13, wherein the optimization information includes contract terms optimized to the travel data.

16. The method of claim 13, wherein the trained machine learning model is a natural language processing model.

17. The method of claim 13, wherein the contract category identifier identifies one or more of discount rate, route, airline, or ticket type.

18. The method of claim 13, wherein the data category identifier identifies one or more of discount rate received, route, airline, ticket type, or number of tickets purchased.

19. The method of claim 13, wherein the travel data is a set of discrete pieces of travel data wherein each piece has its own data category identifier and the contract terms are a set of discrete contract terms wherein each discrete term has its own contract category identifier.

20. A non-transitory machine-readable medium storing instructions executable by a processing device, wherein execution of the instructions causes the processing device to implement a method for automatically processing and classifying contract terms and travel data, the method comprising:
  receiving a plurality of document images of disparate contracts;
  storing the plurality of document images in a database;
  removing noise from each of the plurality of document images;
  aligning each of the plurality of document images;
  preparing each of the plurality of document images for optical character recognition (OCR);
  segmenting each of the plurality of document images into multiple defined segments, where the segments are smaller than the corresponding document image;
  converting each of the defined segments into corresponding text blocks using OCR;
  identifying relevant segments by analyzing the corresponding text blocks and determining that the relevant segments indicate a contract term;
  executing a trained machine learning model on the relevant segments of each of the plurality of document images;
  automatically classifying each of the plurality of document images into a contract category;
  transmitting data relating to the classification of each of the plurality of document images to a client device displaying a user interface;
  receiving input from the client device via the user interface indicating the classification of a document image of the plurality of document images is accurate or inaccurate;
  transmitting the input as feedback to the trained machined learning model to retrain the machine learning model generating a contract category identifier corresponding to the contract category;
receiving travel data and a data category identifier;
determining if the data category identifier corresponds to the contract category identifier and comparing the travel data to the contract term;
generating a discrepancy value based on the comparison of the travel data to the contract term;
generating hypothetical travel data and comparing it to the contract term;
generating a hypothetical travel discrepancy value;
outputting the hypothetical travel data if the hypothetical travel discrepancy value is less than the discrepancy value;
generating a hypothetical contract term and comparing it to the travel data;
generating a hypothetical contract discrepancy value;
generating optimization information;
outputting the hypothetical contract term if the hypothetical contract discrepancy value is less than the discrepancy value;
outputting optimization information wherein the optimization information includes the hypostatical travel data and the hypostatical contract term.

* * * * *